United States Patent [19]

Matsumi et al.

[11] Patent Number: 5,059,872
[45] Date of Patent: Oct. 22, 1991

[54] DIGITAL CONVERGENCE CORRECTION DEVICE

[75] Inventors: Kuninori Matsumi, Fujisawa; Tadahiro Kawagishi, Yokohama; Masahiro Kame, Kasukabe, all of Japan; Makoto Shiomi, Dumont, N.J.; Kousuke Ozeki, Yokohama; Michitaka Ohsawa, Fujisawa, both of Japan

[73] Assignees: Hitachi, Ltd., Tokyo; Hitachi Video Engineering Inc., Kanagawa, both of Japan

[21] Appl. No.: 670,177

[22] Filed: Mar. 15, 1991

[30] Foreign Application Priority Data

Apr. 2, 1990 [JP] Japan .................................. 2-084859

[51] Int. Cl.$^5$ .......................... G09G 1/28; H01J 29/52
[52] U.S. Cl. ................................. 315/368 A; 315/367
[58] Field of Search ................................ 315/367, 368

[56] References Cited

U.S. PATENT DOCUMENTS 4,977,446  12/1990  Shiomi et al. ...................... 315/368

Primary Examiner—Gregory C. Issing
Attorney, Agent, or Firm—Antonelli, Terry, Stout & Kraus

[57] ABSTRACT

The digital convergence correction device is used for a projection-type television receiver having a Braun tube with an aspherical surface fluorescent screen and a projection lens system with an aspherical surface plastic lens attached to the display screen of th Braun tube. In the digital convergence correction device, a digital memory stores digital correction data corresponding to correction values at the convergence adjustment points on the display screen that is divided in the horizontal and vertical directions. A multiplexer reads the digital correction data out of the digital memory, and implements the time division multiplexing for the data. A D/A converter receives the multiplexed data from the multiplexer, and converts it into an analog signal. The device is provided with sample-holding circuits for making coincident timing for the outputs of the time division multiplexing process, so that no phase shift arises at the time division process and multi-channel time division process is made possible. Among numbers of time divisions, an optimal one can be chosen to meet the system requirement. Consequently, the number of D/A converters is reduced thereby to down-cost the digital convergence correction device. The convergence correction device operates in accordance with the correction signals held in the respective sample-holding circuits.

4 Claims, 10 Drawing Sheets

DIGITAL CONVERGENCE CORRECTION DEVICE

BACKGROUND OF THE INVENTION

This invention relates to a digital convergence correction device used for the correction of distortion and correction of convergence for a cathode ray tube screen of a television receiver or display unit.

The prevalence of VTRs and video disks is followed by intense demands of powerful pictures, and the television is now in a phase of offering advanced large screens and home theaters. The result is the wide use of a so-called projection-type televison in which a picture reproduced on the fluorescent screen of a Braun tube is projected through enlargement onto a screen by means of a projection optical system including lenses and mirrors thereby to make a large frame of picture. The projection-type television is superior in chromatic aberration, spherical aberration, comatic aberration, astigmatism, and image curvature, and has improved sharpness (focus) of the image through the use of aspherical surface plastics, aspherical surface projection tube fluorescent screen and short projection optical system.

However, each portion of the screen has a different magnification, creating a so-called distortion in which the figure of an object and its image are not similar. For the distortion, two parameters, i.e., the absolute value and high-order distortion need to be considered. Generally, in the optical design, the above-mentioned aberration and distortion are contradictory, and a compromised point between the two factors is chosen for the design value.

Accordingly, an endless pursuit of the focus performance results in an increased distortion, especially an increased high-order distortion. In addition, the projection-type television operates to form an image on the screen by collecting three-color light beams from three projectors of R, G and B in different directions, and therefore the convergence performance becomes more complicated due to increased distortion.

As a method of correcting the distortion, there is described a technique of analog convergence correction in publication entitled "Color Television Textbook", pp. 262-265, published by Japanese Broadcasting Corporation, for example. This method combines a saw tooth wave and parabolic wave in synchronism with the horizontal sync signal and vertical sync signal to form a correction current and feeds the current to a convergence yoke (will be termed simply CY) thereby to implement the distortion correction and convergence correction.

However, this method is limited in combinations of waveforms, and therefore it can not completely correct the distortion of frame and the color shaft.

On this account, it is indispensable to have a digital convergence correction device which stores arbitrary waveforms which match complex distortions in a memory and converts the waveform data into analog waveforms to drive the convergence yokes.

The conventional digital convergence correction devices accomplish the correction through the provision of a D/A converter for each of the convergence yoke and convergence coil, as described in JP-A-50-68012 and JP-A-61-12191, and accordingly television receivers which use many convergence yokes and convergence coils need as many D/A converters as the number of reception channels. In this method, the screen of the cathode ray tube is partitioned in the horizontal and vertical directions, with the intersections of border lines being set as the convergence adjustment points, predetermined convergence correction values at these adjustment points are stored as digital correction data in a digital memory, the digital correction data is read out of the memory and converted into analog signals with digital-to-analog (D/A) converters, and the signals are fed to the convergence yokes thereby to implement the convergence correction.

In any of cases of a single image reception tube (cathode ray tube) and three image reception tubes for red, green and blue as in a projection-type television receiver, many convergence yokes are often provided for the tube, and in such cases digital correction data for each convergence yoke is read out of the memory and, after conversion into the analog signal with the D/A converter, it is fed to the convergence yoke thereby to implement the convergence correction.

However, this design necessitates D/A converters equal in number to the convergence yokes to e driven, leaving a problem of high cost.

In order to overcome this problem, there is proposed a digital convergence correction device, in which digital correction data for all convergence yokes are read out of a digital memory concurrently, the data are rendered the time division multiplexing with a multiplexer to form serial digital correction data, and it is converted into analog signals with a D/A converter and fed to the respective convergence yokes. This conventional digital convergence correction device will be explained in the following.

FIG. 8 is a block diagram showing the circuit arrangement of the conventional digital convergence correction device which is applied to the three-tube projection-type television receiver. In the figure, indicated by 1 is an input terminal for the horizontal blanking pulse (H. BLK) used for raster scanning, and 2 is an input terminal for the vertical blanking pulse (V. BLK). 3 is a sync pulse generation circuit which produces a clock pulse (not shown) synchronized to the blanking pulses, a horizontal sync pulse 4 and a vertical sync pulse 5, 6 is a horizontal address generation circuit, and 7 is a vertical address generation circuit for reading out a memory 8.

Indicated by 11 and 12 are correction value data which will become the signals for driving a horizontal convergence coil 91 and vertical convergence coil 92 wound on a convergence yoke 101 provided for a red (R) projection tube 111, 13 and 14 are correction value data which will become the signals for driving a horizontal convergence coil 93 and vertical convergence coil 94 provided for a green (G) projection tube 112, and 15 and 16 are correction value data which will become the signals for driving a horizontal convergence coil 95 and vertical convergence coil 96 provided for a blue (B) projection tube 113.

Indicated by 9 is a multiplexer which implements the time division multiplexing for the above-mentioned six correction data in response to the pulses produced by a six-channel time division pulse generation circuit 18, and 17 is multiplexed data resulting from the time division multiplexing for the correction value data 11-16. 10 is a D/A converter which converts the multiplexed digital data into an analog signal 19, 21-26 are sample-holding circuits which restore the individual signal waveforms from the multiplexed analog signal and hold the resulting signals, 30 in a sample-holding pulse generation circuit which generates pulses 31–36 in different phases for driving the sample-holding circuits, 71–76 are low-pass filters (LFSs) used for interpolation, and 81–86 are convergence yoke amplifiers for driving the convergence yokes.

FIG. 9 is a timing chart showing the timing relation among the major signals of the circuit shown in FIG. 8. It is assumed that correction data strings 11, 12 and 16 (13–15 are skipped for the simplicity of explanation) read out of the memory 8 by the address signals are data (RH1, GH1, BV1) in the timing relation shown by a, b and c in FIG. 9. The correction value data strings 11, 12 and 16 are generally data strings of RHi, RBi and BVi and (i=1, 1, ..., n), respectively.

The multiplexer 9 in FIG. 8 selects the correction data strings 11–16 periodically in response to pulse generated by the six-channel time division pulse generation circuit 18 to form a multiplex data string 17 shown by d in FIG. 9 through the time slicing for the six data strings 11–16. The multiplex data string 17 shown by d in FIG. 9 includes a total of eight data, i.e., RH1, GH1, BH1, RV1, GV1 and BV1 plus two pieces of blank data shown by hatching, instead of the former six data which are required inherently, with the reason for eight being a number 2 to the power 3 for the technical convenience in time division multiplexing.

The multiplex data string 17 is fed to the D/A converter 10, which then produces an analog signal shown by e in FIG. 9. The analog signal is fed to the sample-holding circuits 21, 22 and 26 which operate in response to sample-holding pulses 31, 32 and 36 in different phases shown by f, h and j in FIG. 9. Each sample-holding circuit operates to sample the input signal when the sample-holding pulse is high, and it operates to hold the signal when the pulse is low. Consequently, the sample-holding circuits 21, 22 and 26 extract analog signals 41, 42 and 46 shown by g, i and k in FIG. 9.

The analog signals are fed through the low-pass filters (LPFs) 71, 72 and 76 and the convergence yoke amplifiers 81, 82 and 86 so that the convergence yokes 91, 92 and 96 are driven for the convergence correction.

The foregoing conventional digital convergence correction device is advantageous economically since it needs only one D/A converter regardless of the number of convergence yokes to be driven, but on the other hand it suffers from the difficult maneuver of convergence correction which is based on the analog signals of different phases for each channel. The reason for the difficult convergence adjustment will be explained in detail in connection with FIG. 10 showing the screen of a television receiver during the convergence adjustment.

In FIG. 10, indicated by 801 is the frame of the screen. Vertical lines and horizontal lines inside the screen frame 801 are a cross hatch used for the reference of convergence adjustment, and each intersection 802 of a vertical and a horizontal lines is an adjustment point at which the convergence adjustment takes place.

FIG. 11 is a diagram showing the relation between the convergence correction waveforms and the screen positions based on the conventional digital convergence correction device shown in FIG. 8. In the figure, shown by 803 is the partial enlargement of the cross hatch of FIG. 10, indicating the positions on the screen. Indicated by 811, 812 and 816 are the outputs of the sample-holding circuits 21, 22 and 26 in FIG. 8, i.e., the correction waveforms for the convergence yokes 91, 92 and 96 in implementing the convergence correction based on the output signals shown by g, i and k in FIG. 9. The waveforms 811, 812 and 816 have their horizontal axes corresponding to the screen position 803, with the vertical axes representing the level of the convergence yoke correction waveforms.

The waveforms of FIG. 11 reveal that the convergence yoke correction waveforms 811–816 have their peak positions different among the convergence yokes. For the accurate convergence adjustment, it is necessary to assure the state of convergence at the peak position of the convergence yoke correction waveform during the adjustment. It obliges the verification of the convergence yoke correction waveform during the adjustment. It obliges the verification of the convergence state at different screen positions depending on the color and mode of horizontal or vertical correction, resulting in a difficult maneuver of convergence adjustment.

SUMMARY OF THE INVENTION

An object of this invention is to overcome the foregoing prior art deficiencies and provide a digital convergence correction device which facilitates the maneuver of convergence adjustment owing to the coincident peak positions of the correction waveforms for all convergence yokes, while retaining the economical advantage of having a smaller number of D/A converters than the number of convergence yokes to be driven.

In order to achieve the above objective, the present invention resides in a digital convergence correction device which comprises a digital memory which stores the convergence correction values at the convergence adjustment points as digital correction data, a multiplexer which reads the digital correction data of the adjustment points concurrently out of the digital memory and thereafter produces serial data by time division multiplexing, a digital-to-analog (D/A) converter which receives the digital correction data that has been rendered the time division multiplexing by the multiplexer and converts it into an analog signal, a plurality of first sample-holding circuits which sample and hold the serial analog correction signal provided by the D/A converter at a serial timing relation with the adjustment points that have been read out concurrently, a plurality of second sample-holding circuits which sample and hold the contents of the first sample-holding circuits at a same time point upon completion or after the completion of the sample-holding operation of the first sample-holding circuits, and a plurality of convergence correction means which are driven by the analog correction signals held by the second sample-holding circuits.

In the digital convergence correction device, the multiplexer implements the time division multiplexing for the convergence data strings in the memory used to drive the convergence yokes of two or more channels into a single correction data string. The unified correction data string is converted into analog with a single D/A converter, which then produces a single time division multiplexed analog waveform.

The sample-holding circuits (first sample-holding circuits) as many as the number of channels sample the time division multiplexed analog waveform thereby to produce analog waveforms for the individual channels. Subsequently, the sample-holding circuits for timing adjustment (second sample-holding circuits) sample the analog waveforms of all channels at a same timing so that the analog waveforms of all channels have a coincident timing.

Consequently, according to this invention, it becomes possible to implement the D/A conversion for correction data string of multiple channels with a smaller number of D/A converters, which reduces the device cost and also facilitates the convergence adjustment.

DESCRIPTION OF THE PREFERRED EMBODIMENTS

Embodiments of this invention will be described with reference to the drawings.

Figure 1:
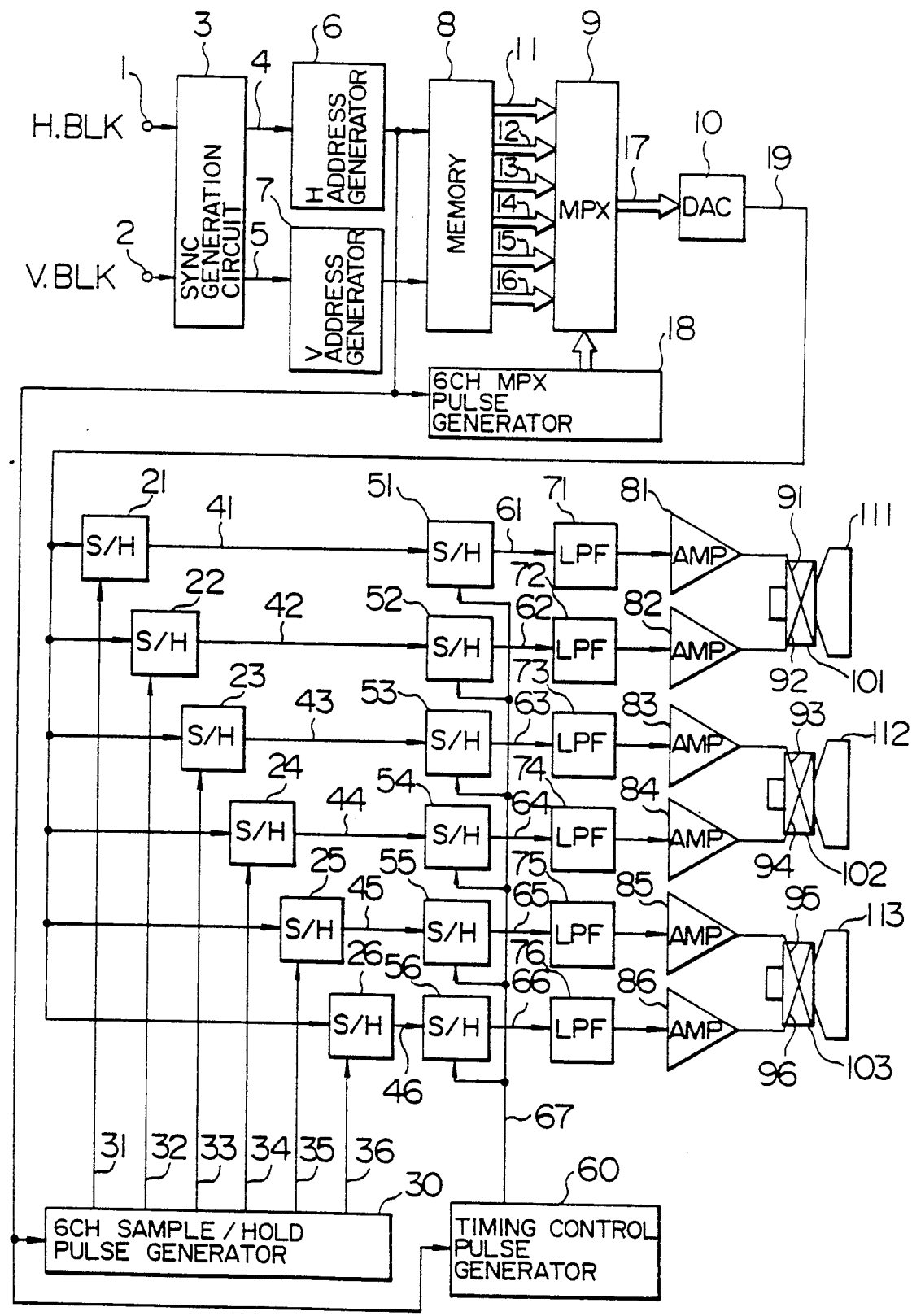
FIG. 1 is a block diagram showing the first embodiment of this invention.
Figure 8:
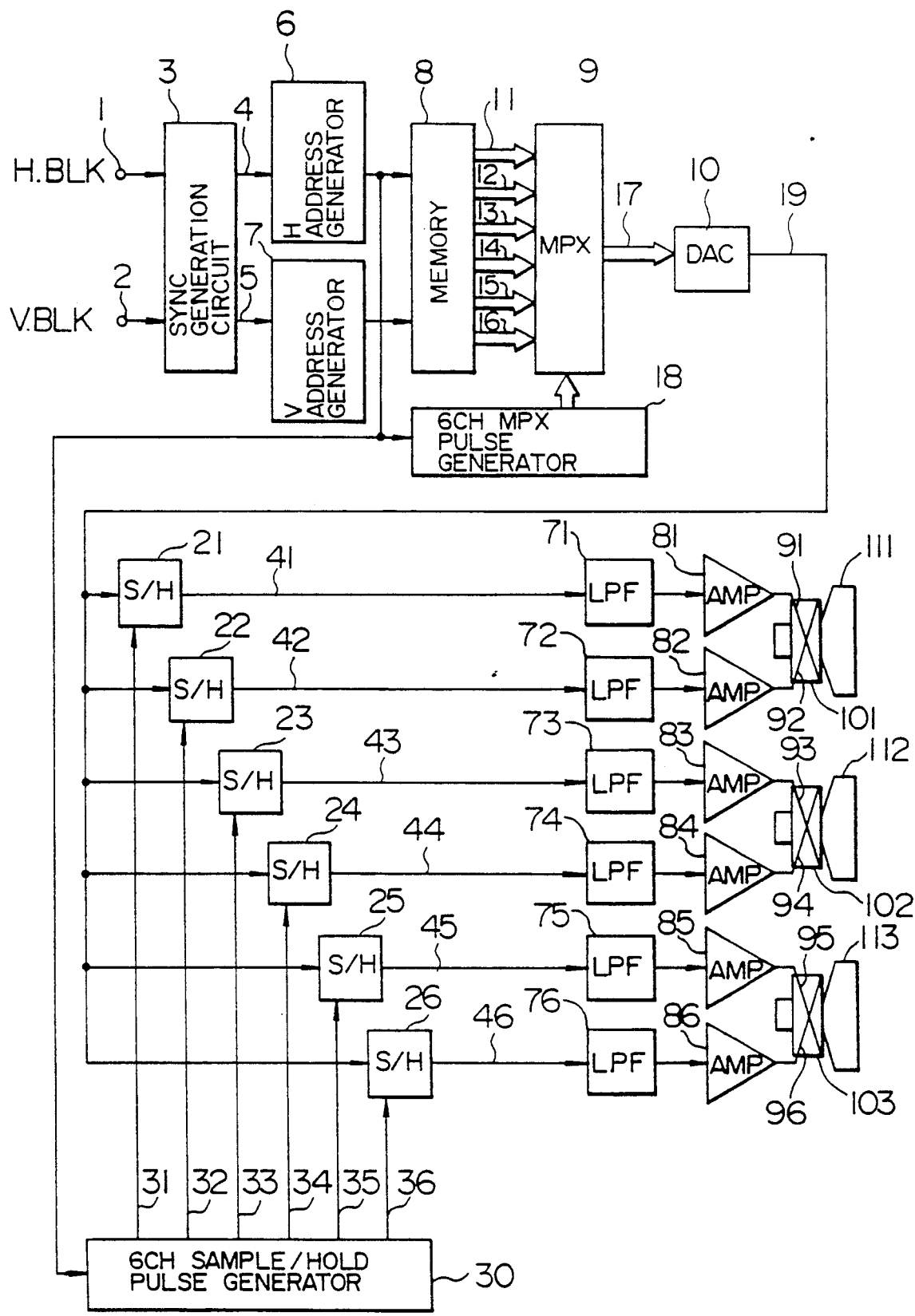
FIG. 8 is a block diagram showing a conventional digital convergence correction device.
Figure 9:
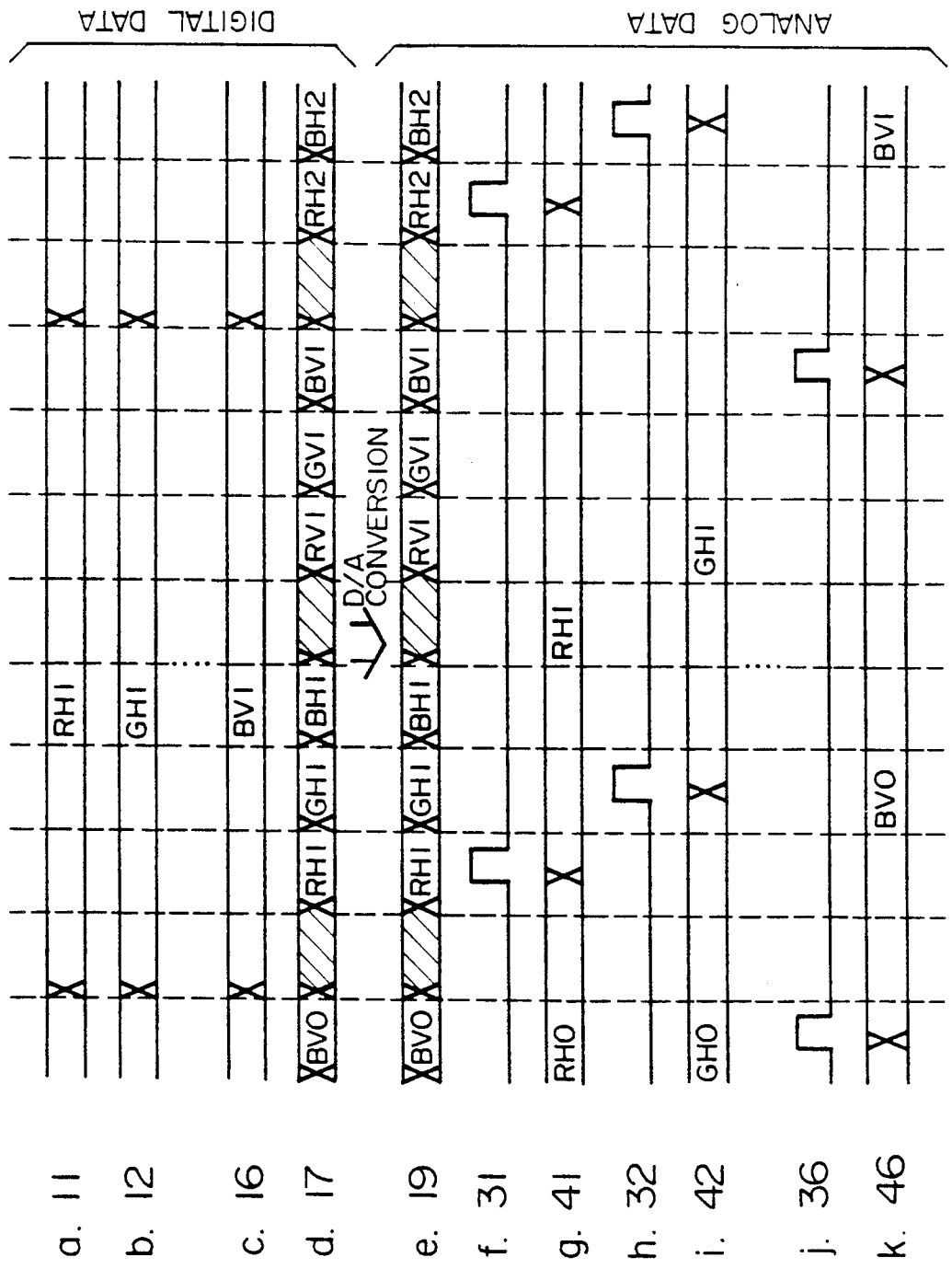
FIG. 9 is a timing chart showing the timing relation among the major signals of the circuit shown in FIG. 8.

FIG. 1 is a block diagram showing the arrangement of the digital convergence correction device based on am embodiment of this invention applied to the three-tube projection-type television receiver. This embodiment, when compared with the conventional device shown in FIG. 8, has additional sample-holding circuits 51-56 as the second sample-holding circuits for timing adjustment and an associated timing control pulse generation circuit 60. The following explains the overall circuit arrangement and its operation.

In the figure, indicated by 1 and 2 are input terminals for the horizontal blanking pulse (H. BLK) and blanking pulse (V. BLK) used for raster scanning. 3 is a sync pulse generation circuit which produces a clock pulse (not shown) synchronized to the blanking pulses, a horizontal sync pulse 4 and a vertical sync pulse 5, and 6 and 7 are horizontal address generation circuit and vertical address generation circuit for generating read-out addresses of a memory 8.

Indicated by 11 and 12 are correction value data which will become the signals for driving a horizontal convergence coil 91 and vertical convergence coil 92 wound on a convergence yoke 101 provided for a red (R) projection tube 111, 13 and 14 are correction value data which will become the signals for driving a horizontal convergence coil 93 and vertical convergence coil 94 provided for a green (G) projection tube 112, and 15 and 16 are correction value data which will become the signals for driving a horizontal convergence coil 95 and vertical convergence coil 96 provided for a blue (B) projection tube 113.

Indicated by 9 is a multiplexer which implements time division multiplexing for the above-mentioned six correction data in response to the pulse produced by a six-channel time division pulse generation circuit 18, and 17 is multiplexed data resulting from the time division multiplexing for the correction value data 11-16. 10 is a D/A converter which converts the multiplexed digital data into an analog signal 19, 21-26 are sample-holding circuits which restore the individual signal waveforms from the multiplexed analog signal, 30 is a sample-holding pulse generation circuit which generates pulses 31-36 in different phases for driving the sample-holding circuits, 51-56 are sample-holding circuits which implement the timing control (adjustment) for making the output timing of each channel coincident, 60 is a timing control pulse generation circuit which generates a pulse 67 for driving the timing control (adjustment) sample-holding circuits, 71-76 are low-pass filters (LPFs) used for interpolation, and 81-86 are convergence yoke amplifiers for driving the convergence yokes.

Figure 2:
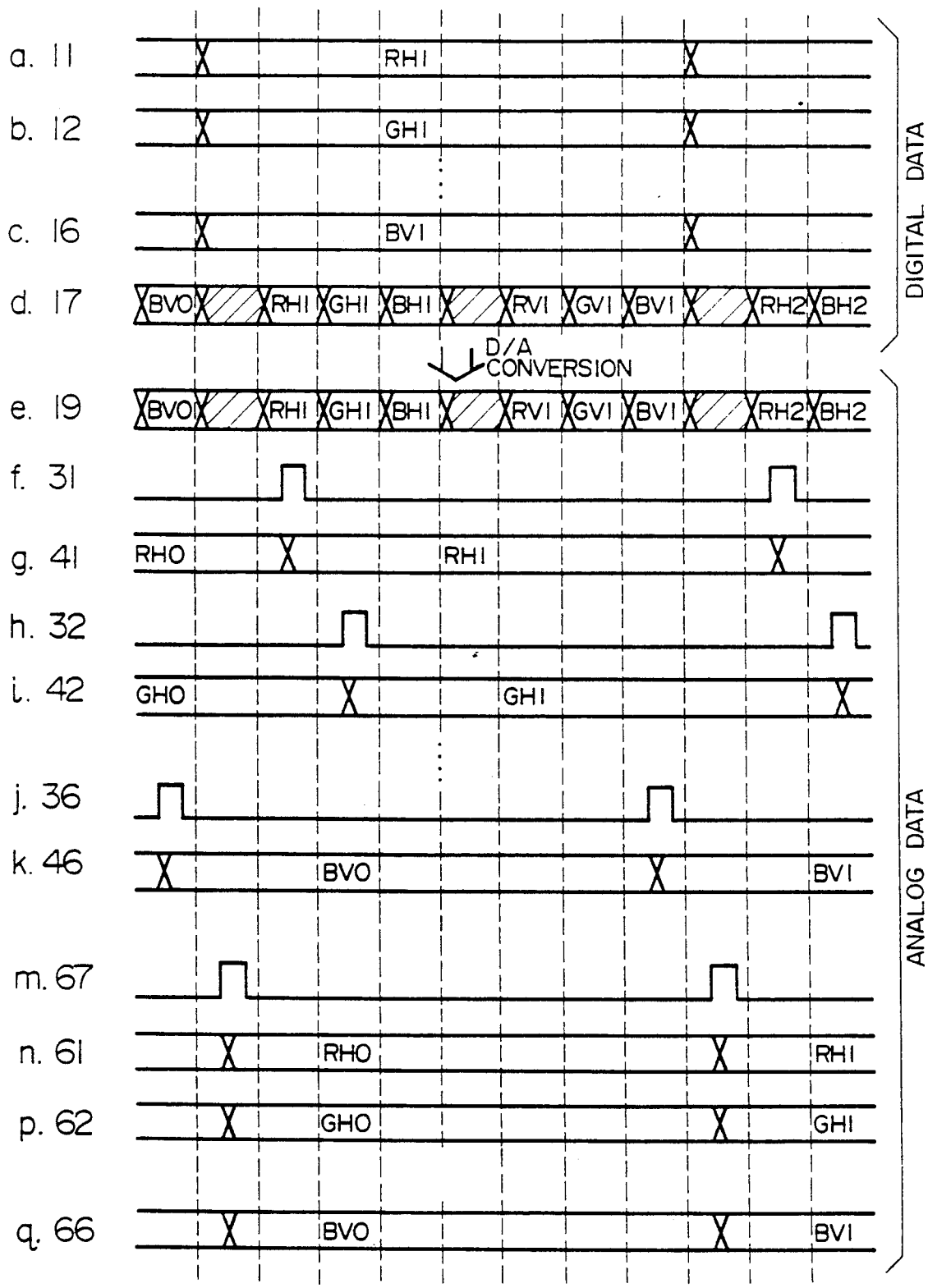
FIG. 2 is a timing chart showing the timing relation among the major signals of the circuit shown in FIG. 1.

FIG. 2 is a timing chart showing the timing relation among the major signals of the circuit shown in FIG. 1. It is assumed in FIG. 1 that correction data strings 11, 12 and 16 read out of the memory 8 by the address signal are data in the timing relation shown by a, b and c in FIG. 2.

The multiplexer 9 in FIG. 1 selects correction data strings 11-16 periodically in response to pulses generated by the six-channel time division pulse generation circuit 18 to form a multiplex data string 17 shown by d in FIG. 2 through the time slicing for the sic data strings 11-16.

The multiplex data string is fed to the D/A converter 10 in FIG. 1, which then produces an analog signal shown by e in FIG. 2. The analog signal is fed to the sample-holding circuits 21, 22 and 26 which operate in response to sample-holding pulses 31, 32 and 36 in different phases shown by f, h and j in FIG. 2. Each sample-holding circuit operates to sample the input signal when the sample-holding pulse is high, and it operates to hold the signal when the pules is low. Consequently, the sample-holding circuits 21, 22 and 26 extract analog signals 41, 42 and 46 shown by g, i and k in FIG. 2.

Subsequently, the analog signals are fed to the sample-holding circuits 51, 52 and 56 for timing control (adjustment) driven by the timing control (adjustment) pulse 67 shown by m in FIG. 2, resulting in analog signals having a coincident timing of data transition among all channels as shown by n, p and q in FIG. 2. The resulting analog signals fed through the low-pass filters 71, 72 and 76 and convergence yoke amplifiers 81, 82 and 86 are used to drive the convergence yokes 91, 92 and 96 thereby to implement the convergence correction.

Figure 11:
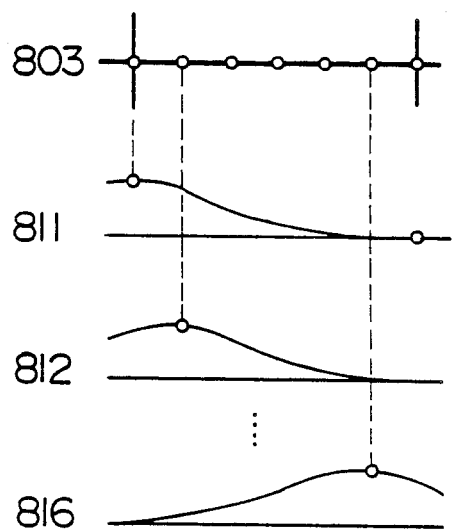
FIG. 11 is a waveform diagram showing the convergence correction waveforms based on the conventional digital convergence correction device.

FIG. 11 is a diagram, which is similar to FIG. 11 explained previously, showing the correspondence between the convergence correction waveform and the screen position for the device arrangement of FIG. 1. In the figure, shown by 803 are positions on the screen, as has been shown by 803 in FIG. 11. Shown by 821, 822 and 826 are correction waveforms for the convergence yokes 91, 92 and 96 in the operation of convergence correction implemented by the arrangement of FIG. 1, i.e., the convergence correction based on the data n, p and q in FIG. 2. The waveforms 821, 822 and 826 have their horizontal axes corresponding to the screen position 803 and their vertical axes representing the level of the convergence yoke correction waveforms.

Figure 10:
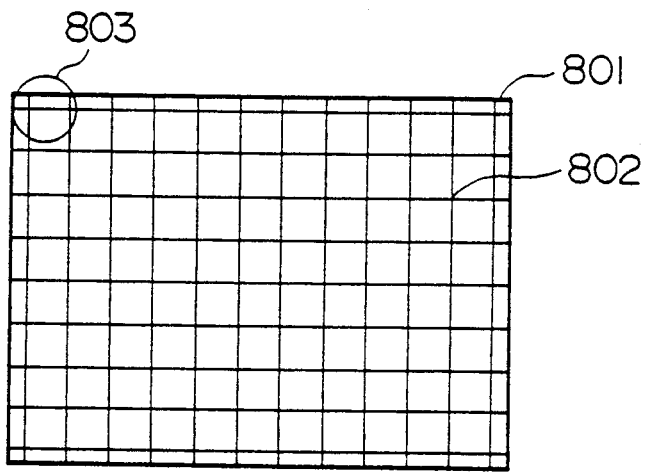
FIG. 10 is an explanatory diagram showing the convergence adjustment points on the screen of cathode rain tube.
Figure 12:
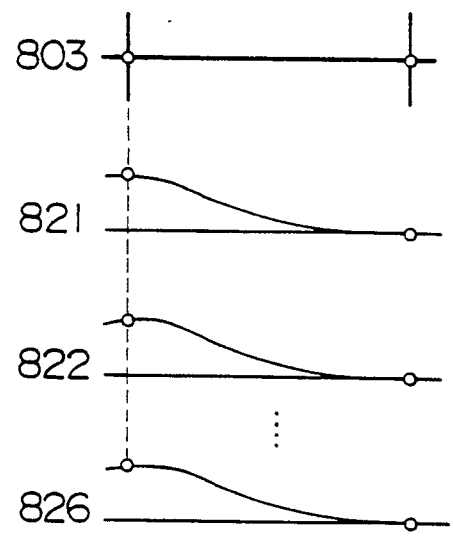
FIG. 12 is a waveform diagram showing the convergence correction waveforms based on the embodiment of this invention.

The comparison of FIG. 12 with FIG. 11 reveals that through the provision of the sample-holding circuits 51-55 for timing control (adjustment), the peak positions of the convergence yoke correction waveforms 821-826 are coincident at all convergence yokes. Accordingly, regardless of the color and the mode of horizontal or vertical correction, accurate convergence correction is accomplished by merely checking the state of convergence at the intersections of the cross hatch shown in FIG. 10.

As described above, the provision of the sample-holding circuits for timing control (adjustment) enables easy and accurate convergence adjustment. Moreover, in the case of the automatic convergence adjustment using light sensitive elements, the number of light sensing positions can be reduced and the algorism of automatic adjustment can be simplified, whereby the time expended for the automatic adjustment can be reduced.

Figure 3:
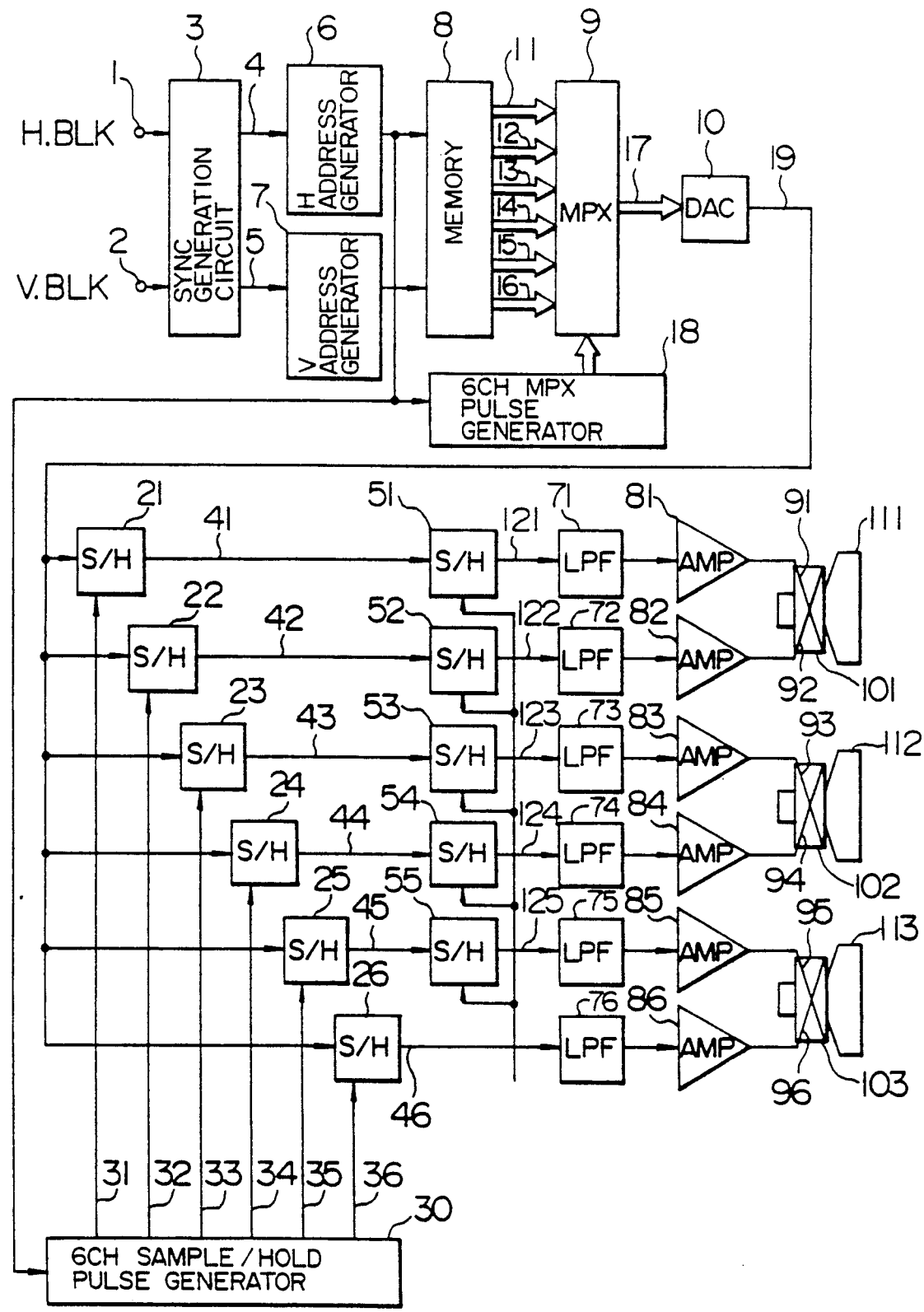
FIG. 3 is a block diagram showing the second embodiment of this invention.

Next, FIG. 3 is a block diagram showing the second embodiment of this invention, and this is a simplified version of the first embodiment shown in FIG. 1. The embodiment of FIG. 3 is derived from the embodiment of FIG. 1, with its timing control pulse generation circuit 60 and one of the timing control (adjustment) sample-holding circuits (56) being removed, and is designed to operate the timing control (adjustment) sample-holding circuits 51-55 in response to the output 36 of the sample-holding pulse generation circuit 30. Namely, the sample-holding circuit 26 of FIG. 1 is used to serve also as the sample-holding circuit 56 in the embodiment of FIG. 3.

Figure 4:
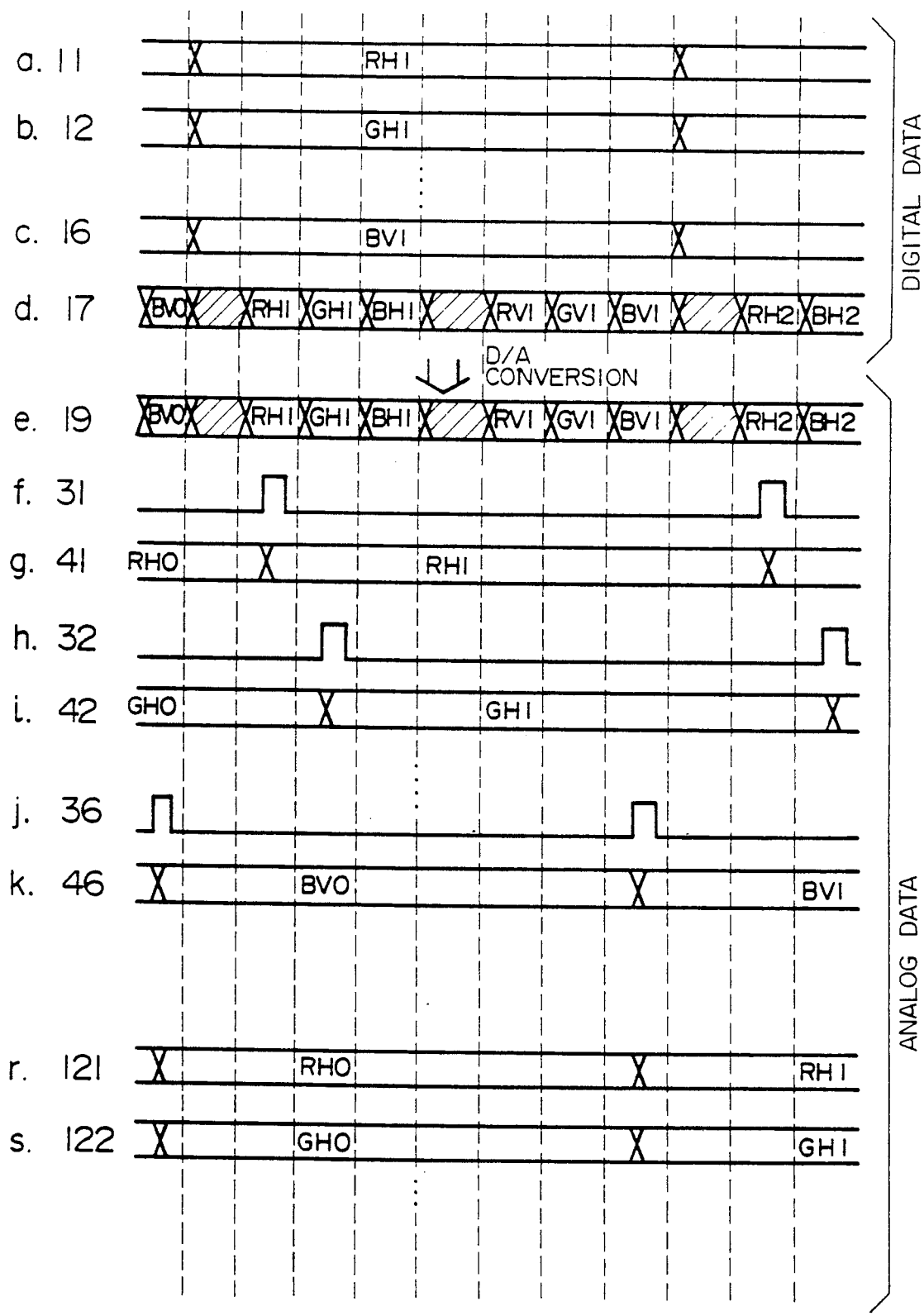
FIG. 4 is a timing chart showing the timing relation among the major signals of the circuit shown in FIG. 3.

FIG. 4 is a timing chart showing the timing relation among the major signals of the circuit shown in FIG. 3. Shown by r and s in FIG. 4 are the outputs 121 and 122 of the timing control (adjustment) sample-holding circuits 51 and 52 in FIG. 3. These outputs 121 and 122 are produced at the timing coincident with the output 46 (k in FIG. 4) of the sample-holding circuit 26. Consequently, convergence correction can be carried out using the analog signals having a coincident data transition timing for all six channels.

This embodiment, despite the simpler structure than the first embodiment shown in FIG. 1, accomplishes the same effectiveness as the first embodiment.

Figure 5:
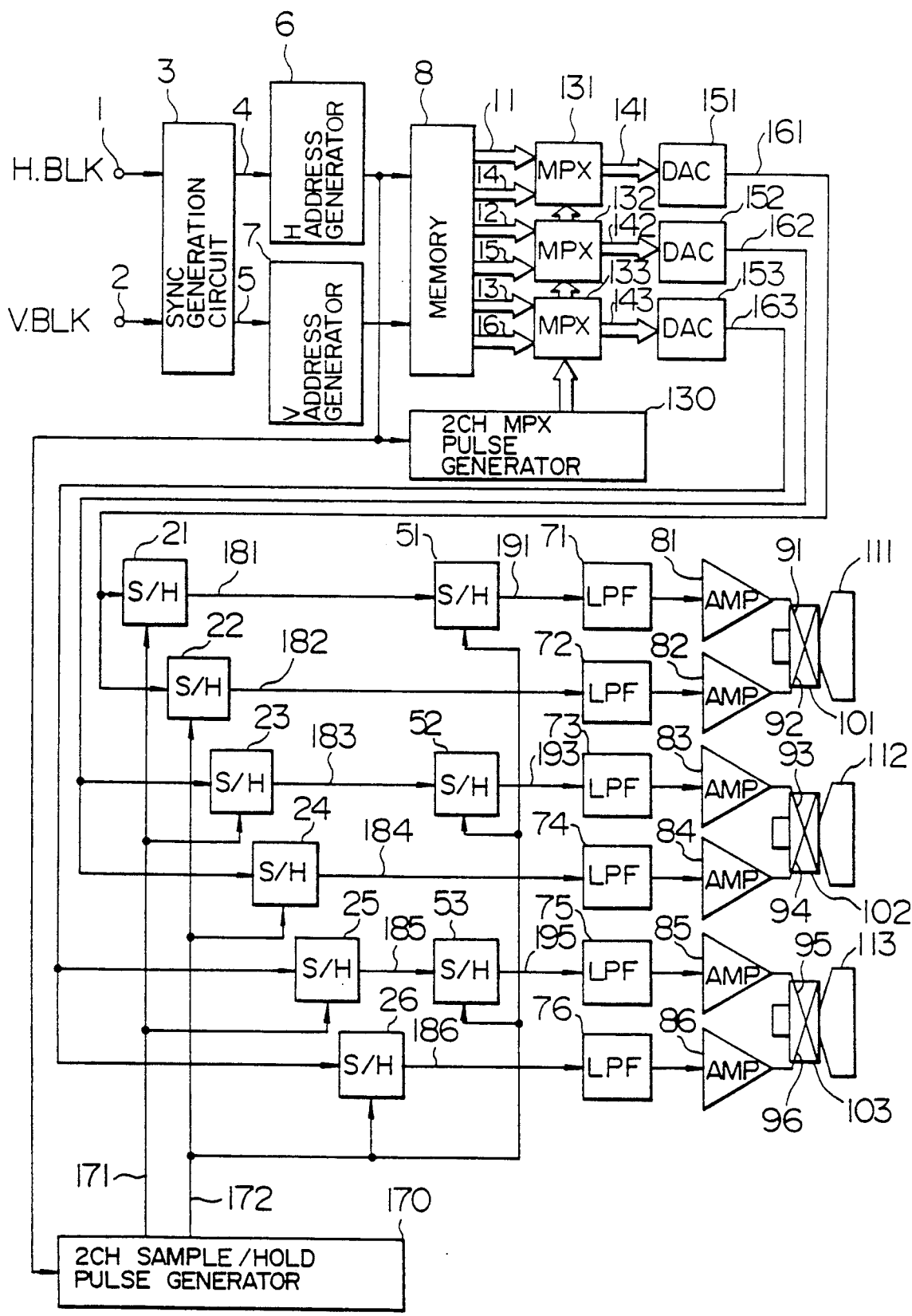
FIG. 5 is a block diagram showing the third embodiment of this invention.

Next, FIG. 5 is a block diagram showing the third embodiment of this invention, and it is intended to deal with a large number of channels, in which case a single D/A converter has a too high duty, through the provision of an increased number of D/A converters so that the number of data divisions is reduced thereby to prevent the conversion speed from rising too high. Shown in FIG. 5 is an embodiment having a division number of two, against six divisions in the embodiment of FIG. 1.

In FIG. 5, indicated by 131 is a multiplexer which implements the time division multiplexing for the correction value data 11 which will become the signal for driving the horizontal convergence coil 91 of the red projection tube 111 and the correction value data 14 which will become the signal for driving the vertical convergence coil 92 of the red projection tube 111 in response to the pulse produced by the two-channel time division pulse generator 130. Similarly, indicated by 132 and 133 are multiplexers which implement the time division multiplexing for the correction value data which will become the signals for correcting the convergence coils of the green projection tube 112 and blue projection tube 113.

Indicated by 141 is the multiplex data value resulting from the correction data 11 and 14 through the time division multiplexing by the multiplexer 131. Similarly, 142 is the multiplex data value resulting from the correction data 12 and 15 through the time division multiplexing by the multiplexer 132, and 143 is the multiplex data value resulting from the correction data 13 and 16 through the time division multiplexing by the multiplexer 133.

Indicated by 151-153 are D/A converters which convert the time division multiplexed digital data into analog signals 161 | 163. 170 is a sample-holding pulse generation circuit which generates pulses 171 and 172 with different phases for driving the sample-holding circuits 21-26.

Figure 6:
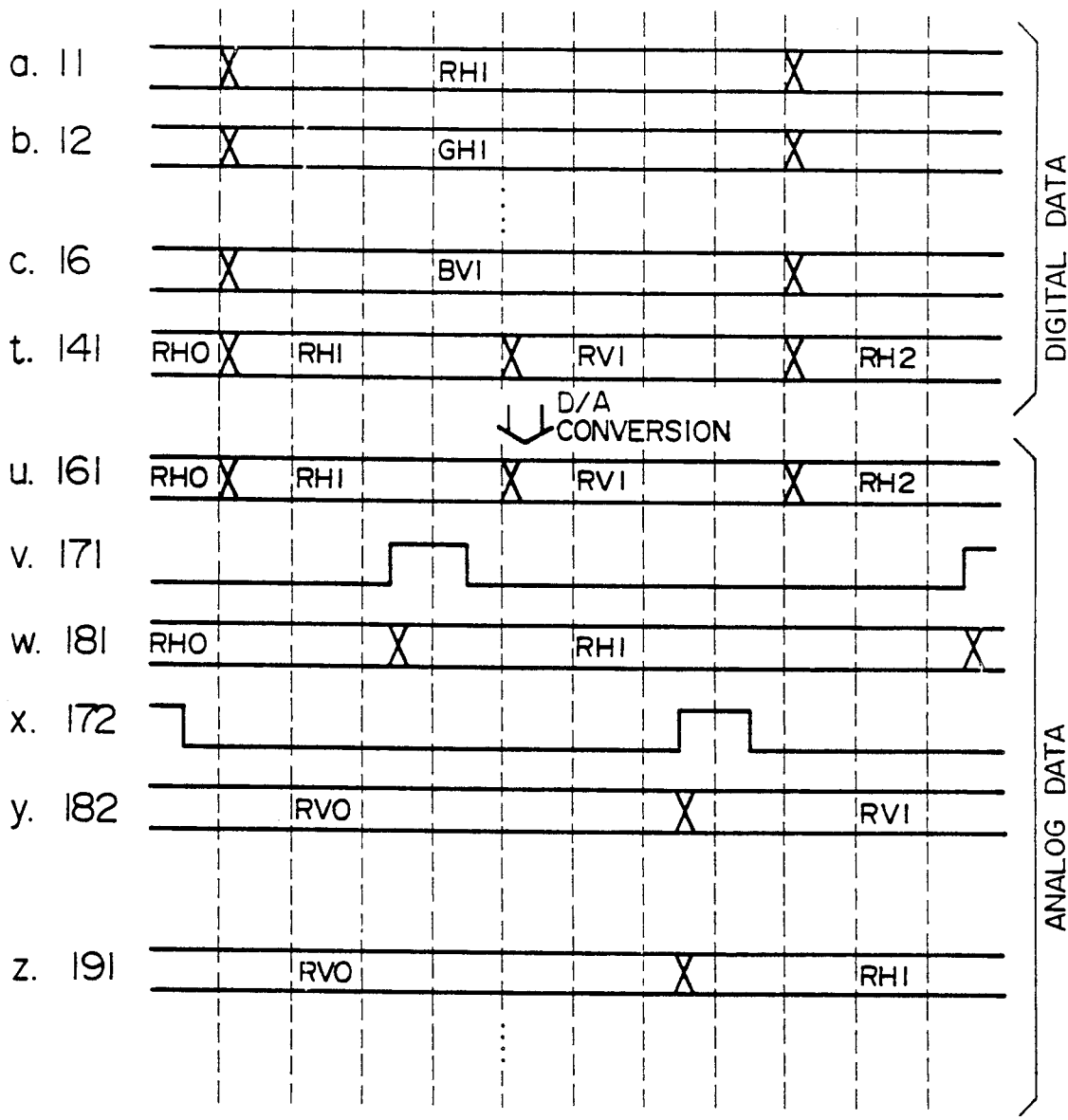
FIG. 6 is a timing chart showing the timing relation among the major signals of the circuit shown in FIG. 5.

FIG. 6 is a timing chart showing the timing relation among the major signals of the circuit shown in FIG. 5.

The multiplexer 131 in FIG. 5 responds to the pulse provided by the two-channel time division pulse generation circuit 130 to select the correction data 11 and 14 periodically thereby to form a multiplex data string 161 shown by t in FIG. 6. The operations for the correction data strings 12 and 15, and 13 and 16 are identical to the case of the correction data 11 and 14, and the explanation thereof will not be repeated.

The multiplex data string is fed to the D/A converter 151 in FIG. 5 which then produces an analog signal 161 shown by u in FIG. 6. The analog signal is fed to the sample-holding circuits 21 and 22 which operate in response to sample-holding pulses 171 and 172 in different phases shown by v and x in FIG. 6, and extract analog signals 181 and 182 shown by w and y in FIG. 6.

Subsequently, the analog signal 181 is fed to the sample-holding circuit 51 for timing control (adjustment) driven by the sample-holding pulse 172, and it produces an analog signal 191 (shown by z in FIG. 6) having a coincident timing of transition as that of the output 182 (shown by z in FIG. 6) of the sample-holding circuit 22. Similarly, the analog signals for other channels are produced, and the convergence correction can be carried out using the analog signals having a coincident timing of data transition among all six channels.

According to this embodiment, the number of time divisions is less than the cases of the first embodiment shown in FIG. 1 and the second embodiment shown in FIG. 3, and in exchange of an increased number of D/A converters, the conversion speed required thereof can be lowered. Consequently, for the high-definition television, high-definition display unit or the like, which the convergence correction signal includes high frequency components and the number of time divisions can be too large for the D/A converters to respond, this embodiment can deal with the situation by reducing the number of time divisions.

Figure 7:
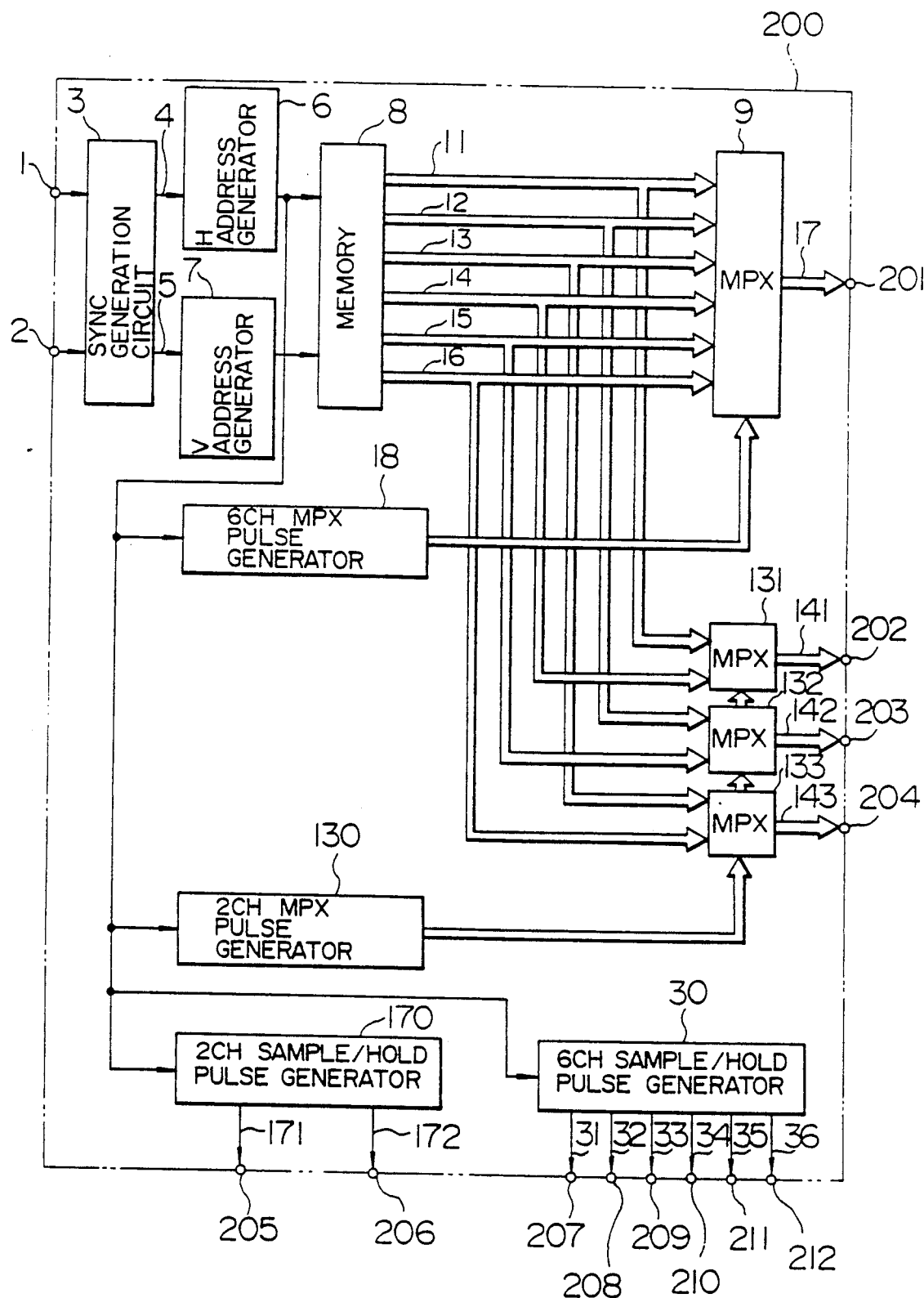
FIG. 7 is a block diagram showing the fourth embodiment of this invention.

FIG. 7 is a block diagram showing the fourth embodiment of this invention.

This embodiment is designed to cope with the requirements of a digital convergence correction device operating with a larger number of time divisions by using a smaller number of D/A converters, and of a device operating with a smaller number of time divisions by using a larger number of D/A converters. The figure shows the arrangement of an integrated circuit (IC) which performs the digital signal processing of the digital convergence system capable of dealing with a variable number of time divisions.

In FIG. 7, functional blocks identical to those of FIG. 3 and FIG. 5 are referred to by the same numerals. In the figure, indicated by 200 is an integrated circuit for implementing the digital signal processing of the digital convergence system, 201 is an output terminal for a six-channel time division multiplex data string 17, and 207–212 are output terminals for the outputs of the sample-holding pulses 31–36 produced in the six-channel time division processing. 202–204 are output terminals for two-channel time division multiplex data strings 141–143, 205 and 206 are output terminals for sample-holding pulses 171 and 172 produced in the two-channel time division multiplexing process.

In the case of using the integrated circuit 200 as a six-channel time division system, the output terminal 201 of the six-channel time division multiplex data string is connected to a D/A converter and the output terminals 207–212 of sample-holding pulses are connected to sample-holding circuits thereby to form the same configuration as FIG. 3. The operation is identical to the arrangement of FIG. 3.

In the case of using the integrated circuit 200 as a two-channel time division system, the output terminals 202–204 of the two-channel time division multiplex data strings are connected to D/A converters and the output terminals 205 and 206 of sample-holding pulses are connected to sample-holding circuits thereby to form the same configuration as FIG. 5. The operation is identical to the arrangement of FIG. 5.

This embodiment, which is based on a single integrated circuit, is capable of choosing an optimal number of time divisions to meet the application system, i.e., depending on the specifications of a television receiver and the conversion speed of the available D/A converters, the number of time divisions can be chosen so that the number of D/A converters is as small as possible. The number of time divisions is not confined to the case of this embodiment, but it may be three or more. The device may have an additional operating mode in which data strings 11–16 are delivered to the outside and the time division process is implemented externally.

According to this invention, it becomes possible for the digital convergence correction device to have its costly D/A converters reduced. The coincident phase of the correction waveforms among all channels enables easy and accurate convergence adjustment. In the case of automatic convergence adjustment by using light sensitive elements, the number of positions where the elements are placed can be reduced and the algorism of automatic adjustment can be simplified, whereby the time expended for the adjustment can be reduced.

Moreover, through the use of a single integrated circuit for digital signal processing designed to select a number of time division arbitrarily, it becomes possible for a low-cost digital convergence system to have a small number of expensive D/A converters as possible depending on the specifications of a television receiver, the processing speed of D/A converters, etc.

We claim:

1. A digital convergence correction device comprising:
    a digital memory for storing digital correction data which corresponds to correction values at a plurality of convergence adjustment points on a display screen that is divided in the horizontal and vertical directions;
    a multiplexer which reads out digital correction data for the respective adjustment points from said digital memory, and implements the time division multiplexing for the data;
    a digital-to-analog converter which receives the digital correction data provided by said multiplexer, and converts the data into an analog signal;
    a plurality of first sample-holding circuits which samples and hold the analog correction signal provided by said digital-to-analog converter at time points corresponding to the respective adjustment points;
    a plurality of second sample-holding circuits which sample and hold the contents of said first sample-holding circuits at a same time point on completion or after completion of the sample-holding operation of said first sample-holding circuits; and
    a plurality of convergence correction means driven by the analog correction signals held by said second sample-holding circuits.

2. A digital convergence correction device according to claim 1, wherein the sample-holding circuit, among said first sample-holding circuits, which samples and holds the analog correction signal at the last of the time points is used to serve also as one of said second sample-holding circuits.

3. A digital convergence correction device comprising:
    a digital memory for storing digital correction data which corresponds to correction values at a plurality of convergence adjustment points on a display screen that is divided in the horizontal and vertical directions;
    multiplexers which read out, by making groups, digital correction data for the respective adjustment points from said digital memory, and implements the time division multiplexing for the groups of data;
    digital-to-analog converters, provided for said groups individually, which receive the digital correction data provided by said multiplexers, and convert the data into analog signals;
    a plurality of first sample-holding circuits which sample and hold the analog correction signal provided by said digital-to-analog converters at time points corresponding to the respective adjustment points of said individual groups;
    a plurality of second sample-holding circuits which sample and hold the contents of said first sample-holding circuits at a same time point on completion or after completion of the sample-holding operation of said first sample-holding circuits; and
    a plurality of convergence correction means driven by the analog correction signals held by said second sample-holding circuits.

4. A digital convergence correction device including a digital signal processing circuit, said device comprising:
    a digital memory for storing digital correction data which corresponds to correction values at a plurality of convergence adjustment points on a display screen that is divided in the horizontal and vertical directions;
    a first multiplexer which reads out, by making groups in a first number of groups, digital correction data for the respective adjustment points from said digital memory, and implements the time division multiplexing for the groups of data;
    second multiplexers converters, provided for said groups individually, which group the readout digital correction data into groups in a second number of groups different from said first number of groups, and implement the time division multiplexing for the groups of data;

a first timing signal source which generates a timing signal for introducing the digital correction data from said first multiplexer into sample-holding circuits; and a second timing signal source which generates a timing signal for introducing the digital correction data from said second multiplexers into sample-holding circuits.

* * * * *